No. 673,107. Patented Apr. 30, 1901.
G. S. BARKER.
BRAKE SYSTEM FOR RAILWAY CARS.
(Application filed Apr. 19, 1900.)
(No Model.) 2 Sheets—Sheet 1.
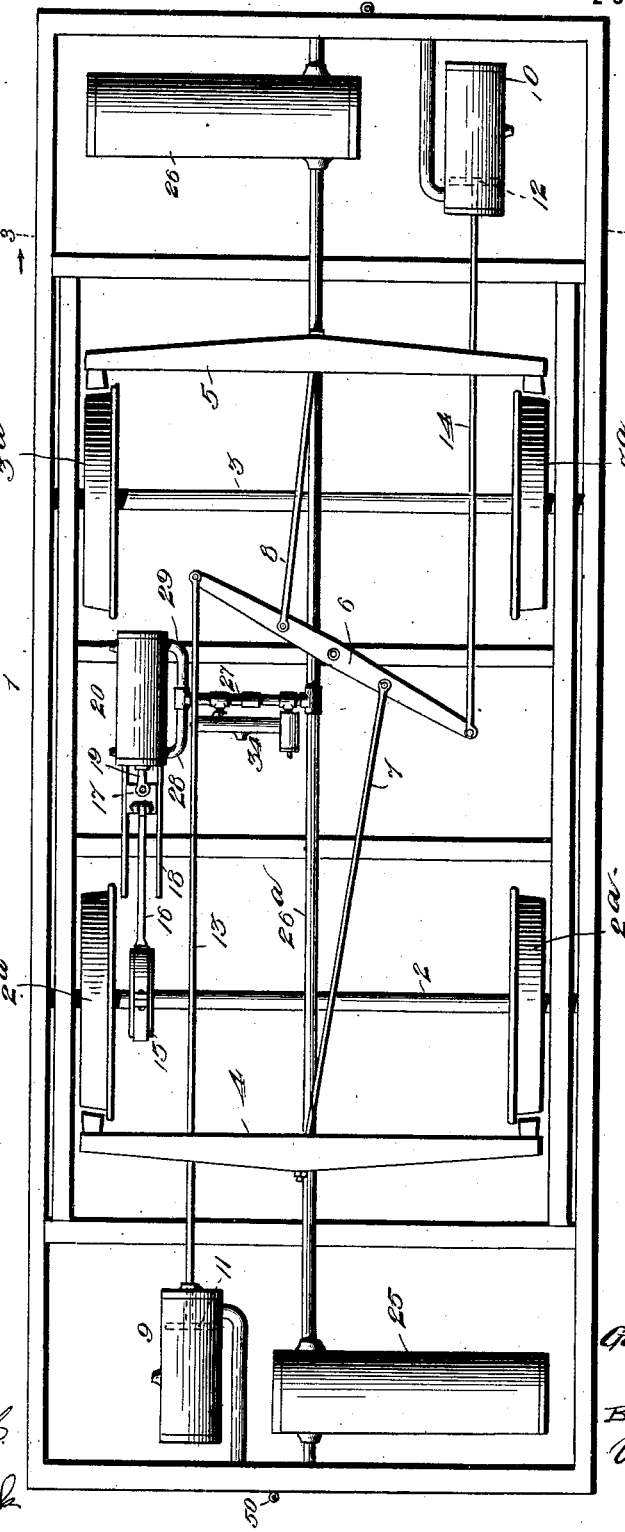
Witnesses
George S. Barker,
Inventor
By
Victor J. Evans.
Attorney No. 673,107. Patented Apr. 30, 1901.
G. S. BARKER.
BRAKE SYSTEM FOR RAILWAY CARS.
(Application filed Apr. 19, 1900.)
(No Model.) 2 Sheets—Sheet 2.
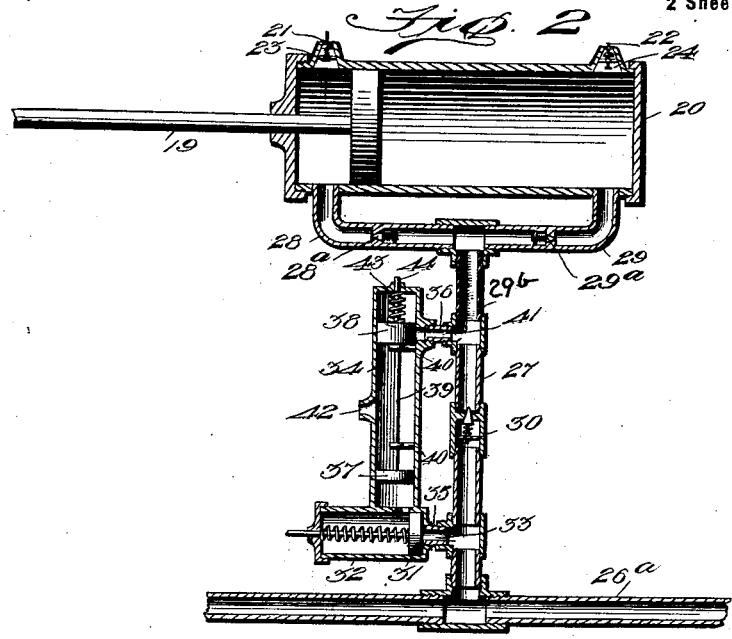
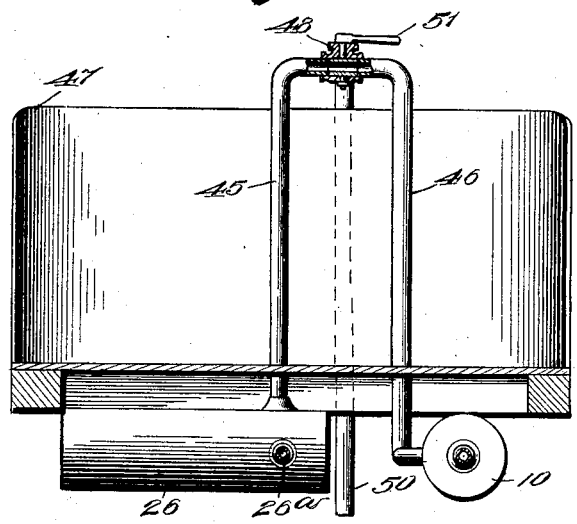
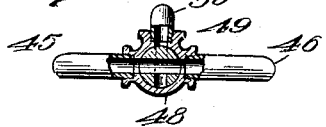
George S. Barker,
Inventor
By Victor J. Evans.
Attorney
Witnesses

UNITED STATES PATENT OFFICE.

GEORGE S. BARKER, OF AUGUSTA, MAINE, ASSIGNOR OF ONE-HALF TO J. R. GOULD, OF HALLOWELL, MAINE.

BRAKE SYSTEM FOR RAILWAY-CARS.

SPECIFICATION forming part of Letters Patent No. 673,107, dated April 30, 1901.

Application filed April 19, 1900. Serial No. 13,533. (No model.)

*To all whom it may concern:*

Be it known that I, GEORGE S. BARKER, a citizen of the United States, residing at Augusta, in the county of Kennebec and State of Maine, have invented certain new and useful Improvements in Brake Systems for Railway-Cars or other Vehicles, of which the following is a specification.

My invention relates generally to air-brake systems, but more particularly to brakes of that class known as the "momentum-pump" type; and the primary object thereof is to construct a fluid-pressure brake the air reservoir of which will be charged by the rotation of an axle on the car or vehicle to which it is attached.

A further object is to provide an automatic cut-off to the supply-reservoir and means for exhausting the air from the pump through a branch pipe when the said reservoir has become sufficiently charged.

With these objects in view my invention consists in certain novel parts and combinations of parts, all of which will be specifically described hereinafter and recited in the appended claims.

In the drawings the air-brake system is shown as applied to an electric-propelled car, although I reserve the right to apply the same to any vehicle.

Figure 1 represents a bottom plan view of a car of approved construction to which my invention is applied. Fig. 2 is a transverse sectional view of the pump and exhaust mechanism. Fig. 3 is a transverse sectional view taken on the line 3 3 of Fig. 1, showing the controlling-valve in section; and Fig. 4 is a cross-sectional view of the controlling-valve.

Referring now to the drawings by reference-numerals, 1 designates the bottom of a street or other railway car provided with axles 2 and 3, suitably journaled and carrying the wheels 2ª and 3ª, respectively.

4 and 5 designate transversely-arranged brake-beams carrying shoes for frictional contact with the tread of the wheels and connected to the centrally-pivoted lever 6 by rods 7 and 8.

At each end of the car and to one side of the center thereof are brake-cylinders 9 and 10, in which are arranged reciprocating spring-pressed pistons 11 and 12, which are also connected to the ends of the lever 6 by pitmen 13 and 14, so that when suitable pressure is applied in one or both cylinders the brake will be applied.

On the axle 2 is arranged a cam or eccentric 15, the pitman 16 of which is connected to a sliding block 17, reciprocating in guides 18 and operating the pump-piston 19, sliding in the pump-cylinder 20, so that air will be drawn into said cylinder through the openings 21 and 22, normally closed by the check-valves 23 and 24, to supply air to the supply-reservoirs 25 and 26 through a centrally-located longitudinally-arranged pipe 26ª, which is connected to the pump by a flexible pipe 29ᵇ, preferably of rubber, communicating with the pump-cylinder by two branch pipes 28 and 29, in which are oppositely-arranged check-valves 28ª and 29ª, the purpose of which will be readily apparent. This pipe 29ᵇ is made flexible to allow for the vibration of the parts, it being understood that the pump is secured to one of the trucks, while the pipes and brake mechanism are secured to the bottom of the car or vehicle.

By reference to Fig. 2 it will be seen that a check-valve 30 is arranged in the pipe 27, so that air will be forced from the pump into the supply-pipe 26ª and incidentally conveyed to the reservoirs; but a backward pressure from said cylinders would tend to close said valve 30. When an abnormal pressure occurs in the reservoirs, the air will force the spring-retained valve 31 in the cylinder 32 and pass thereinto through the opening 33 and into the cylinder 34, connected to the pipe 27 by the couplings 35 and 36. The pressure will then be exerted upon the piston 37 of the sliding-valve 38, connected to said piston by a rod 39, sliding in guides 40, to force said valve 38 away from the passage 41, so that air will be admitted into the cylinder 34 and pass out into the open air through an opening 42. This valve 38 is normally held in the position shown in Fig. 2 by a coil-spring 43, abutting thereagainst and in contact with the end of the cylinder 34 and surrounding a guide-pin 44, so that the air will be conveyed through the proper channels to the reservoirs under normal conditions, and said valve will only be unseated by an excessive pressure in the reservoirs and supply-pipes.

To operate the brake, I connect each of the reservoirs with the adjacent brake-cylinder by two vertical pipes 45 and 46, which run up in rear of the respective dashboards 47 and have their ends connected by a coupling 48, carrying a three-way controlling-valve 49, adapted to communicate with a branch or exhaust pipe 50, which is also connected to the coupling and which can communicate with either the reservoir or brake-cylinder, as desired, although in actual practice it will probably only be used to exhaust any air in the brake-cylinders after the brakes have been applied and it is desired to release the shoes from contact with the wheels. This valve 49 is operated in an obvious manner through the medium of a suitable handle 51 and by the motorman or other authorized person.

It will be seen that ordinarily the pump will force a reserve supply of air into the reservoirs provided for that purpose; but when this supply becomes excessive the back pressure will hold the valve 30 on its seat and by forcing the valve 31 away from its seat operate the piston 37 to move the valve 38, whereby the extra amount of air may be exhausted. It will be further seen that the controlling-valve is within easy reach of the motorman and can be readily operated.

While I have described in detail what to me appears to be the very best means of accomplishing the desired result, I do not wish to be restricted thereto, as I am aware that slight changes might be made without affecting the utility of this invention. For instance, the controlling mechanism might be modified to adapt the invention to steam-railway cars or any other propelled vehicle without affecting the mechanism illustrated in Figs. 1 and 2, and I reserve the right to make such changes and alterations as would properly come within the scope of this invention and without departing from the spirit thereof.

Having thus fully described my invention, what I claim as new, and desire to secure by Letters Patent, is—

1. In a fluid-pressure brake for cars or other propelled vehicles the combination with a pump, reservoirs connected thereto, brake-cylinders and a brake mechanism of a pipe connected to the pump and reservoir, a valve in said pipe adapted to open normally but to remain seated under pressure, of a cylinder connected to the pipe between the pump and the valve and having communication with the outside atmosphere, a second cylinder connected to the pipe between the reservoir and the valve and communicating with the cylinder above referred to, a spring-pressed valve in the first-named cylinder normally closing the communication between the pipe and the cylinder but adapted to be unseated so as to permit the air to pass direct from the pump through the cylinder to the outside atmosphere, and a spring-pressed valve in the second-named cylinder adapted to normally remain seated, but to be unseated by an excessive pressure in the reservoirs whereby the valve in the first-named cylinder will be unseated for the purpose set forth.

2. In a brake system for cars or other vehicles, the combination with a momentum-pump and a supply-pipe leading therefrom, two cylinders connected to and adapted to communicate with said pipe and with each other, a check-valve between the connections and carried by the pipe, said valve adapted to be opened by pressure from the momentum-pump but seated by an excessive pressure from the reservoir a cylinder connected to the pipe between the pump and valve, and communicating therewith but having its passage normally closed, a second cylinder between the reservoir and the valve and communicating both with the first-named cylinder and the pipe, and a spring-pressed valve in the last-named cylinder adapted to be opened by backward pressure from the reservoir so as to permit the opening of the passage in the first-named cylinder with the pipe so as to allow the air to pass off from the pump at a point between the pump and the first-named valve substantially as described.

In testimony whereof I affix my signature in presence of two witnesses.

GEORGE S. BARKER.

Witnesses:
W. G. KEEN,
W. K. JACKSON.